US009362053B2

(12) United States Patent
Okamoto

(10) Patent No.: US 9,362,053 B2
(45) Date of Patent: Jun. 7, 2016

(54) MULTILAYER CERAMIC CAPACITOR AND METHOD OF MANUFACTURING THE SAME

(71) Applicant: Murata Manufacturing Co., Ltd., Nagaokakyo-shi, Kyoto-fu (JP)

(72) Inventor: Takafumi Okamoto, Nagaokakyo (JP)

(73) Assignee: Murata Manufacturing Co. Ltd., Kyoto (JP)

( * ) Notice: Subject to any disclaimer, the term of this patent is extended or adjusted under 35 U.S.C. 154(b) by 0 days.

(21) Appl. No.: 14/583,923

(22) Filed: Dec. 29, 2014

(65) Prior Publication Data

US 2015/0109717 A1    Apr. 23, 2015

Related U.S. Application Data

(63) Continuation of application No. PCT/JP2013/066730, filed on Jun. 18, 2013.

(30) Foreign Application Priority Data

Jul. 10, 2012 (JP) ................ 2012-154455

(51) Int. Cl.
*C04B 35/00* (2006.01)
*H01G 4/12* (2006.01)
(Continued)

(52) U.S. Cl.
CPC ............ *H01G 4/1227* (2013.01); *H01G 4/012* (2013.01); *H01G 4/248* (2013.01); *H01G 4/30* (2013.01); *H01G 13/04* (2013.01)

(58) Field of Classification Search
CPC .......................... C04B 35/468; C04B 35/4682
USPC ......................... 501/137, 138, 139
See application file for complete search history.

(56) References Cited

U.S. PATENT DOCUMENTS 6,205,014 B1* 3/2001 Inomata ................ H01G 4/30 361/312
7,157,396 B2* 1/2007 Watanabe ............. H01G 4/30 361/321.4

(Continued)

FOREIGN PATENT DOCUMENTS

JP    63-103861 A    5/1988
JP    04-169003 A    6/1992

(Continued)

OTHER PUBLICATIONS

Official Communication issued in International Patent Application No. PCT/JP2013/066730, mailed on Jul. 16, 2013.

(Continued)

*Primary Examiner* — Noah Wiese
(74) *Attorney, Agent, or Firm* — Keating & Bennett, LLP

(57) ABSTRACT

A multilayer ceramic capacitor includes a multilayer body including a plurality of stacked dielectric layers including a dielectric ceramic that includes a plurality of crystal grains and a plurality of internal electrodes disposed at a plurality of interfaces between the dielectric layers, and external electrodes. The multilayer body includes a Ba and Ti containing perovskite compound, La, Mg and Mn, and satisfies conditions such that in a case in which a content of Ti is set to 100 molar parts, a fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts, and an average number of crystal grains included in each of the dielectric layers in the stacking direction is one or more to three or less.

17 Claims, 2 Drawing Sheets

(51) Int. Cl.
*H01G 4/012* (2006.01)
*H01G 4/248* (2006.01)
*H01G 4/30* (2006.01)
*H01G 13/04* (2006.01)

(56) References Cited

U.S. PATENT DOCUMENTS

| | | | |
|---|---|---|---|
| 7,419,927 B2* | 9/2008 | Ito | H01G 4/10 501/138 |
| 8,445,397 B2* | 5/2013 | Yamaguchi | C04B 35/4682 361/321.4 |
| 2005/0088803 A1 | 4/2005 | Umeda et al. | |
| 2012/0075770 A1* | 3/2012 | Banno | B82Y 30/00 361/321.4 |
| 2012/0081836 A1* | 4/2012 | Yamaguchi | C04B 35/4682 361/321.4 |
| 2012/0147524 A1* | 6/2012 | Okamoto | H01B 3/12 361/321.4 |

FOREIGN PATENT DOCUMENTS

| | | |
|---|---|---|
| JP | 11-317322 A | 11/1999 |
| JP | 2007-234677 A | 9/2007 |
| JP | 2012-41226 A | 3/2012 |
| KR | 10-2005-0039654 A | 4/2005 |

OTHER PUBLICATIONS

Official Communication issued in corresponding Korean Patent Application No. 10-2014-7036949, mailed on Mar. 8, 2016.

* cited by examiner

US 9,362,053 B2

MULTILAYER CERAMIC CAPACITOR AND METHOD OF MANUFACTURING THE SAME

BACKGROUND OF THE INVENTION

1. Field of the Invention

The present invention relates to a multilayer ceramic capacitor and a method for manufacturing the same, and in particular relates to a multilayer ceramic capacitor including a multilayer body provided with a plurality of stacked dielectric layers and a plurality of internal electrodes disposed at a plurality of interfaces between the dielectric layers, and an external electrode provided on an outer surface of the multilayer body and electrically connected to some of the inner electrodes and a method for manufacturing the same.

2. Description of the Related Art

In recent years, a multilayer ceramic capacitor which is compact in size but can offer a large capacitance has been widely used in an electronic device to make the electronic device small in size and light in weight. For example, as illustrated in FIG. 2, the multilayer ceramic capacitor is configured to include a multilayer body 10 provided with a plurality of stacked dielectric layers (dielectric ceramic layers) 11 and a plurality of internal electrodes 12 disposed at a plurality of interfaces between dielectric layers 11, and a pair of external electrodes 13a and 13b disposed on both end surfaces of multilayer body 10 in conduction with internal electrodes 12 exposed alternately on opposite end surfaces.

In the multilayer ceramic capacitor mentioned above, as a material for forming the dielectric layers, a dielectric ceramic material which has a high relative dielectric constant and includes Ba and Ti containing a perovskite compound as a primary ingredient has been widely used.

As the dielectric ceramic material, a non-reducible dielectric ceramic composition is proposed (see Japanese Patent Laying-Open No. 4-169003). The non-reducible dielectric ceramic composition contains $BaTiO_3$ at 95.0 to 98.0 mol % and rare earth oxide at 2.0 to 5.0 mol % as a principal component, and contains MnO and oxide glass mainly composed of $BaO$—$SrO$—$Li_2O$—$SiO_2$ as a minor component. In $BaTiO_3$, the content of unreacted BaO is 0.7 wt % or less and a ratio of Ba/Ti is 1.005 to 1.025. The rare earth oxide contains at least one element selected from La, Nd, Sm, Dy and Er. If the principal component is set to 100 parts by weight, MnO is 0.3 to 1.5 parts by weight and the oxide glass is 0.5 to 2.5 parts by weight.

Since the non-reducible dielectric ceramic composition is superior in capacitance-temperature characteristics, when it is used as a dielectric layer (dielectric ceramic layer) in a multilayer ceramic capacitor, it is possible to make the dielectric layer thinner.

However, based on the material composition of the non-reducible dielectric ceramic composition of the prior art, when it is used as an extremely thinned dielectric layer in a multilayer ceramic capacitor, the aging variation in insulation resistance in a high temperature load test will be great, which makes it impossible to obtain a multilayer ceramic capacitor with sufficient reliability.

SUMMARY OF THE INVENTION

Preferred embodiments of the present invention provide a multilayer ceramic capacitor having a small aging variation in insulation resistance in a high temperature load test, a superior insulation deterioration tolerance and a high reliability, and a method for manufacturing the same.

A multilayer ceramic capacitor according to a preferred embodiment of the present invention includes a multilayer body provided with a plurality of stacked dielectric layers including a dielectric ceramic that includes a plurality of crystal grains and a plurality of internal electrodes disposed at a plurality of interfaces between the dielectric layers, and an external electrode provided on an outer surface of the multilayer body and electrically connected to some of the plurality of inner electrodes. The multilayer body includes a Ba and Ti containing perovskite compound, and La, Mg and Mn. In a case in which a content of Ti is set to 100 molar parts, a fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts, and an average number of crystal grains included in each of the dielectric layers in the stacking direction is one or more to three or less.

Further, a multilayer ceramic capacitor according to a preferred embodiment of the present invention includes a multilayer body provided with a plurality of stacked dielectric layers including a dielectric ceramic that includes a plurality of crystal grains and a plurality of internal electrodes disposed at a plurality of interfaces between the dielectric layers, and an external electrode provided on an outer surface of the multilayer body and electrically connected to some of the plurality of inner electrodes. The multilayer body includes a Ba and Ti containing perovskite compound, and La, Mg and Mn. In a case in which the multilayer body is subjected to a dissolution treatment to form a solution and a content of Ti is set to 100 molar parts, a fraction of each content of La, Mg and Mn relative to the content of Ti is La is about 1.2 to about 6.0 molar parts, Mg is about 0.5 to about 5.0 molar parts and Mn is about 1.0 to about 3.0 molar parts, and an average number of crystal grains included in each of the dielectric layers in the stacking direction is one or more to three or less.

In the present invention, "the multilayer body being subjected to a dissolution treatment to form a solution" conceptually means that the multilayer body is made to form a solution by dissolving it in acid, or the multilayer body is made to form a solution by subjecting it to alkali fusion and then dissolving it in acid or by any other ways, and thus, no particular restriction is applied to the method for forming a solution by the dissolution treatment.

Furthermore, a multilayer ceramic capacitor according to a preferred embodiment of the present invention includes a multilayer body provided with a plurality of stacked dielectric layers including a dielectric ceramic that includes a plurality of crystal grains and a plurality of internal electrodes disposed at a plurality of interfaces between the dielectric layers, and an external electrode provided on an outer surface of the multilayer body and electrically connected to some of the plurality of inner electrodes. The multilayer body includes a Ba and Ti containing perovskite compound, and La, Mg and Mn. In a case in which a content of Ti is set to 100 molar parts, the fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts, and an average number of crystal grains included in each of the dielectric layers in the stacking direction is one or more to three or less.

Yet another preferred embodiment of the present invention provides a method for manufacturing a multilayer ceramic capacitor which includes a multilayer body provided with a plurality of stacked dielectric layers including a dielectric ceramic that includes a plurality of crystal grains and a plurality of internal electrodes disposed at a plurality of interfaces between the dielectric layers, and the method preferably includes the steps of preparing a ceramic slurry by blending powder including a Ba and Ti containing perovskite compound, an La containing compound powder, an Mg containing compound powder and an Mn containing compound powder into a slurry in which a content of Ti is set to 100 molar parts, a fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts; obtaining a ceramic green sheet by forming the ceramic slurry into a sheet; providing an unfired multilayer body by stacking the ceramic green sheet and a conductor pattern which defines and serves as the internal electrode after firing; and firing the unfired multilayer body to provide the multilayer body which is configured to have the internal electrode being disposed between the dielectric layers, and an average number of crystal grains included in each of the dielectric layers in the stacking direction is one or more to three or less.

Since multilayer ceramic capacitors according to various preferred embodiments of the present invention satisfy such conditions that the multilayer body, which is provided with a plurality of stacked dielectric layers (dielectric ceramic layers) including a dielectric ceramic including a plurality of crystal grains and a plurality of internal electrodes disposed at a plurality of interfaces between the dielectric layers, includes a Ba and Ti containing perovskite compound and La, Mg and Mn, and in a case in which a content of Ti is set to 100 molar parts, a fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts, and an average number of crystal grains included in each dielectric layer in the stacking direction is one or more to three or less, the Mean Time To Failure ("MTTF") of the product at the high temperature load test is high, which makes it possible to obtain a multilayer ceramic capacitor with a high reliability.

Specifically, when the Ba and Ti containing perovskite compound is added with La, Mg and Mn, if the fraction of each content of La, Mg and Mn relative to the content of Ti is controlled to be within the ranges of various preferred embodiments of the present invention and the average number of crystal grains included in each dielectric layer in the stacking direction is reduced (the number of grain boundaries is reduced) to three or less, it is possible to further improve the insulation deterioration tolerance. In other words, in the multilayer ceramic capacitors according to various preferred embodiments of the present invention, the grain boundary present in the dielectric layer deteriorates in the insulation property, leading to failure, and thus reducing the number of grain boundaries will make it possible to improve the characteristics.

In a case where the multilayer ceramic capacitors of various preferred embodiments of the present invention are configured to satisfy such conditions that the multilayer body provided with a plurality of stacked dielectric layers and a plurality of internal electrodes disposed at a plurality of interfaces between the dielectric layers is subjected to a dissolution treatment to form a solution, and if the content of Ti is set to 100 molar parts, a fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts, and an average number of crystal grains included in each dielectric layer in the stacking direction is one or more to three or less, the MTTF of the product at the high temperature load test is high, which makes it possible to obtain a multilayer ceramic capacitor with a high reliability.

In a case where the multilayer ceramic capacitor of the present invention is configured to satisfy such conditions that the dielectric layer constituting the multilayer body contains a Ba and Ti containing perovskite compound, La, Mg and Mn, and in the case where the content of Ti is set to 100 molar parts, the fraction of each content of La, Mg and Mn relative to the content of Ti is in the range that La is 1.2 to 6.0 molar parts, Mg is 0.5 to 5.0 molar parts and Mn is 1.0 to 3.0 molar parts, and an average number of crystal grains included in each dielectric layer in the stacking direction is one or more to three or less, the MTTF of the product at the high temperature load test is high, which makes it possible to obtain a multilayer ceramic capacitor with a high reliability.

In a case where the multilayer ceramic capacitors of various preferred embodiments of the present invention are configured to satisfy such conditions that the dielectric layer constituting the multilayer body contains Ba and Ti containing a perovskite compound, La containing compound powder, Mg containing compound powder and Mn containing compound powder into a slurry in which in the case where a content of Ti is set to 100 molar parts, a fraction of each content of La, Mg and Mn relative to the content of Ti is such that La is about 1.2 to about 6.0 molar parts, Mg is about 0.5 to about 5.0 molar parts and Mn is about 1.0 to about 3.0 molar parts, to obtain a ceramic green sheet by forming the ceramic slurry into a sheet, to provide an unfired multilayer body by stacking the ceramic green sheet and a conductor pattern which defines and serves as the internal electrode after firing, to fire the unfired multilayer body to provide the multilayer body which is configured in such a manner that the internal electrode is disposed between the dielectric layers and an average number of crystal grains included in each dielectric layer in the stacking direction is one or more to three or less, it is possible to manufacture the multilayer ceramic capacitor satisfying the abovementioned conditions of the present invention efficiently.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
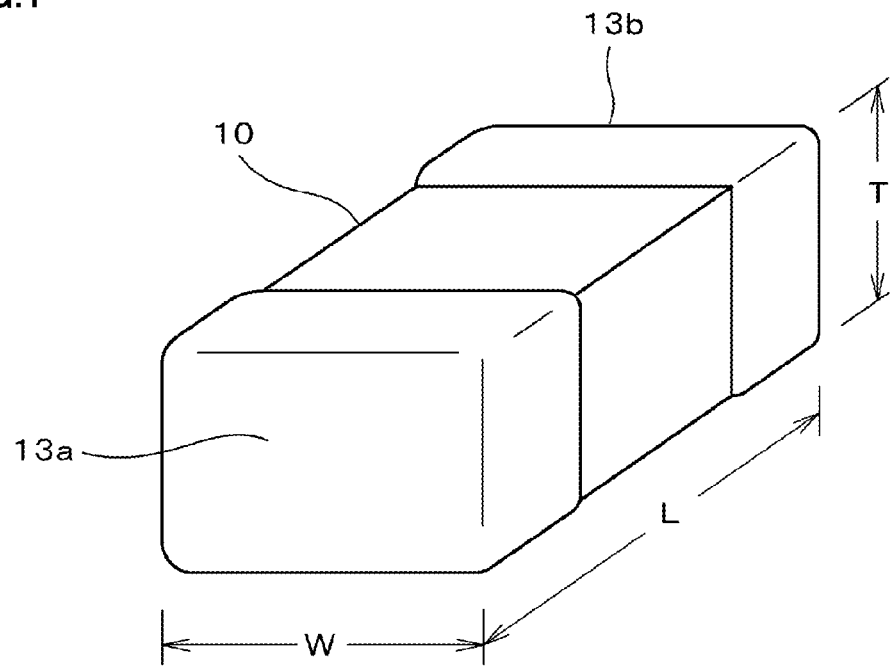
FIG. 1 is a perspective view of a multilayer ceramic capacitor according to a preferred embodiment of the present invention.

Hereinafter, preferred embodiments of the present invention are described to explain the features of the present invention in detail.

First, a non-limiting example of a method of manufacturing a multilayer ceramic capacitor according to a preferred embodiment of the present invention will be described.

To prepare a multilayer ceramic capacitor, firstly, as a starting material for Ba and Ti containing perovskite compound (barium titanate based composite oxide), $BaCO_3$ powder and $TiO_2$ powder were prepared respectively.

Then, each powder was weighed such that the fraction of the content of Ba relative to the content of Ti is 103 molar parts relative to 100 molar parts of Ti.

The weighted powder was mixed by a ball mill with water serving as a medium, pre-fired at 1050° C., and pulverized to provide Ba and Ti containing perovskite compound powder (ceramic powder).

In the Ba and Ti containing perovskite compound, Ca and Sr may be included into the site of Ba, and Zr and Hf may be included into the site of Ti.

In the present preferred embodiment, although the pre-firing was preferably performed at 1050° C., the pre-firing temperature is not limited thereto, and it may be any appropriately selected temperature suitable for obtaining desired characteristics.

Thereafter, to the perovskite compound powder prepared as described above, $R_2O_3$ (R=La, Gd, Dy), $MgCO_3$ and $MnCO_3$ were added so that the fraction of content of each added component relative to the content of Ti in the powder is equal to each corresponding fraction (molar part) listed in Table 1 relative to 100 molar parts of Ti, and $SiO_2$ was added at the fraction of 1.5 molar parts. The mixture was blended in water by a ball mill to provide the dielectric material.

The obtained dielectric material was dissolved in acid and subjected to ICP emission spectrometry, it was confirmed that the composition thereof is substantially identical to the composition listed in Table 1.

The dielectric material was added with a polyvinyl butyral-based binder and an organic solvent such as ethanol, and followed with wet blending by a ball mill to prepare a ceramic slurry.

Subsequently, the ceramic slurry was formed into a sheet by a doctor blade method in such a manner that the thickness of the dielectric layer (dielectric ceramic layer) after firing is 4.0 μm, and thus, a rectangular or substantially rectangular ceramic green sheet was obtained. Next, a conductive paste containing Ni as a conductive component was printed on the ceramic green sheet through screen printing to provide a conductor pattern (internal electrode pattern) which defines and serves as an internal electrode after firing.

A plurality of the ceramic green sheets each provided with a conductor pattern (internal electrode pattern) were stacked in such a manner that the end surfaces where the conductor pattern is exposed opposite to each other alternately to provide an unfired multilayer body. Thereafter, the unfired multilayer body was heated to 260° C. under an air atmosphere to remove the binder.

Thereafter, the unfired multilayer body after removal of the binder was fired by keeping it at 1160° C. to 1300° C. for 3 hours under a reducing atmosphere composed of $H_2$—$N_2$—$H_2O$ gas to provide a fired multilayer body. In the firing step, the temperature where the unfired multilayer body was kept for 3 hours was appropriately adjusted in the abovementioned range of 1160° C. to 1300° C., and thus, the average number of crystal grains (average grain number) contained in each dielectric layer (dielectric ceramic layer) in the stacking direction was controlled.

Next, a Cu electrode paste was applied to the end surfaces of the fired multilayer body obtained in the above and baked to provide external electrodes, and thus, the multilayer ceramic capacitor (samples with sample numbers of 1 to 23 in Table 1 for characteristic measurement) was obtained. A perspective view of the multilayer ceramic capacitor is schematically illustrated in FIG. 1 and a front cross-sectional view thereof is schematically illustrated in FIG. 2.

Figure 2:
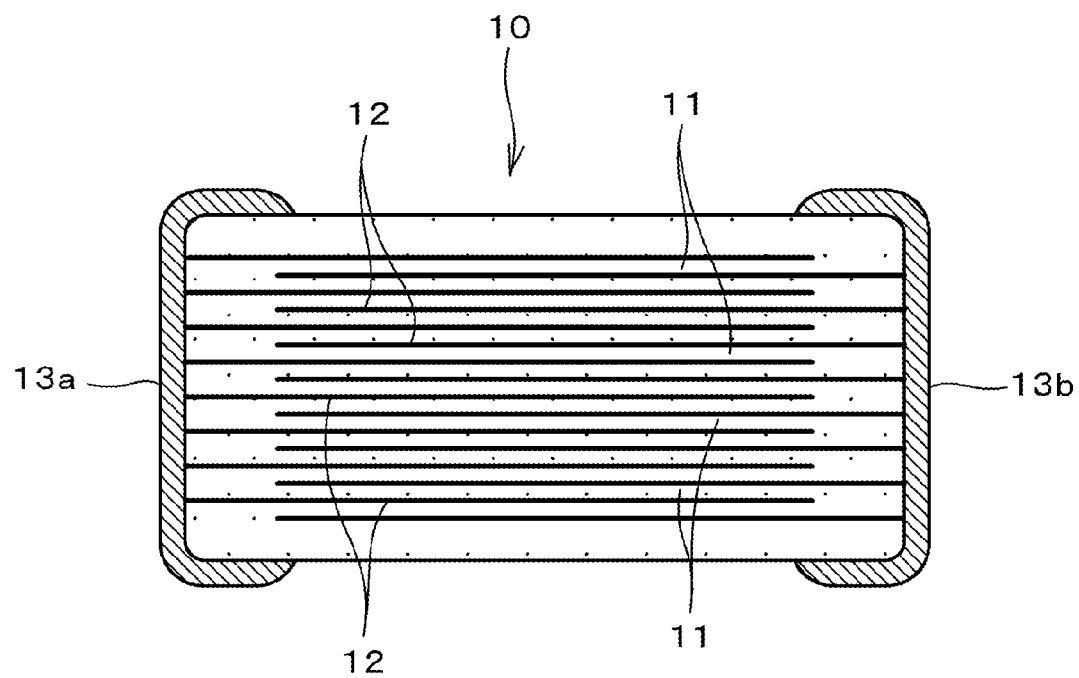
FIG. 2 is a front cross-sectional view of a multilayer ceramic capacitor according to a preferred embodiment of the present invention.

As illustrated in FIGS. 1 and 2, the multilayer ceramic capacitor is configured to include a multilayer body (multilayer ceramic element) 10 provided with a plurality of stacked dielectric layers (dielectric ceramic layers) 11 and a plurality of internal electrodes 12 disposed at a plurality of interfaces between dielectric layers 11, and a pair of external electrodes (Cu electrodes) 13a and 13b disposed on both end surfaces of multilayer body 10 in conduction with internal electrodes 12 exposed alternately on opposite end surfaces.

Regarding the dimensions of the multilayer ceramic capacitors prepared as described above, the width (W) thereof preferably was about 1.0 mm, the length (L) thereof preferably was about 2.0 mm, and the thickness (T) thereof preferably was about 0.6 mm. The thickness of dielectric layer 11 interposed the internal electrodes preferably was about 4.0 μm, and the thickness of internal electrode 12 preferably was about 0.8 μm, for example. The total number of effective dielectric ceramic layers excluding the outer layers preferably is 100, and the opposite area of electrodes per layer preferably was about 1.7 $mm^2$, for example.

After the external electrodes (Cu electrodes) were removed from the multilayer ceramic capacitor obtained as mentioned above, the multilayer ceramic capacitor without the external electrodes was dissolved in acid and subjected to ICP emission spectrometry, it was confirmed that the multilayer ceramic capacitor, excluding the ingredient Ni constituting the internal electrode, had a composition substantially identical to each composition listed in Table 1.

The average number of crystal grains (average grain number) contained in each dielectric layer was determined by an interception method. Specifically, the average number of crystal grains in each dielectric layer was measured as follows.

First, the multilayer body (multilayer ceramic device) 10 was sectioned approximately at the midpoint of the length (L) direction of the multilayer ceramic capacitor along the thickness (T) direction and the width (W) direction. Then, in order to make clear the boundary (grain boundary) between the grains in dielectric layer 11, the sectioned multilayer body (sample) was subjected to heat treatment. The temperature of the heat treatment is set to such a temperature that at which the grain growth will not occur and the grain boundary will become clear, and in the present embodiment, it was set to 1000° C., for example.

Figure 3:
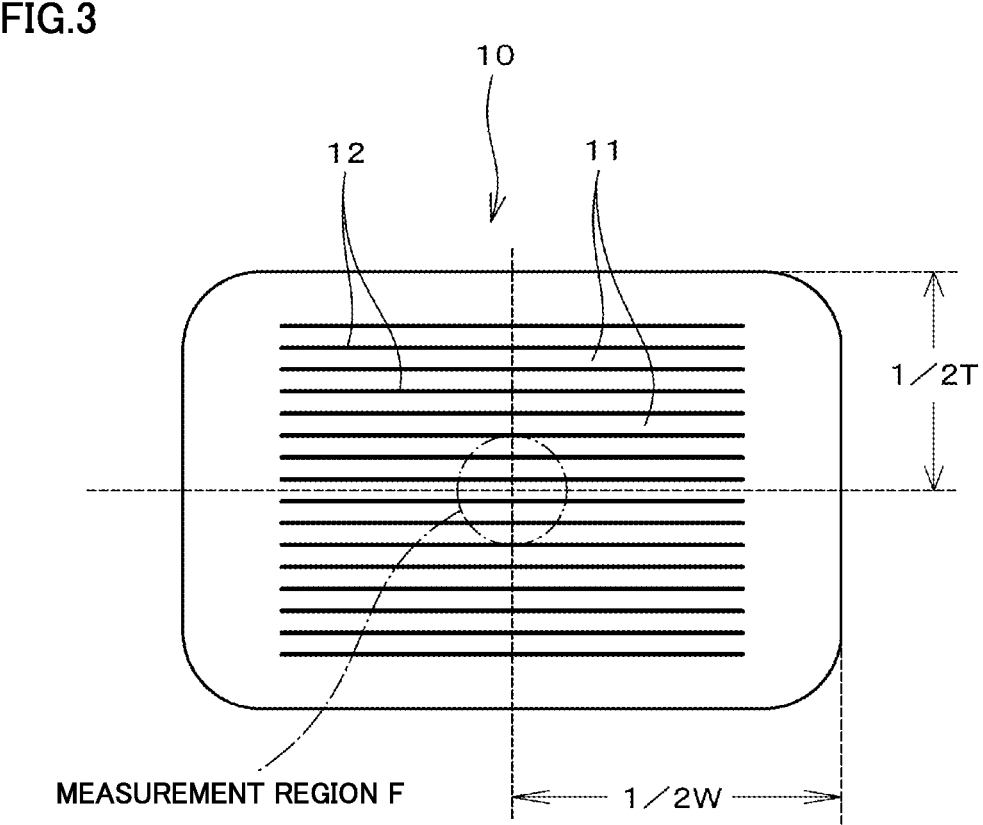
FIG. 3 is a view for explaining a method of measuring an average number of crystal grains in each dielectric layer of a multilayer ceramic capacitor according to a preferred embodiment of the present invention.

After multilayer body 10 was sectioned, a region (substantially the central region in the section surface) in the section surface (WT face) around a position having roughly ½W in the W direction and ½T in the T direction was determined as a measurement region F (see FIG. 3), and the measurement region was observed with a scanning electron microscope (SEM) at a magnification power of 10,000 times.

First, 200 crystal grains were randomly extracted from the measurement region. The grain size of each of 200 crystal grains was measured according to the diameter method in which the maximum length of each crystal grain in a direction parallel to the principal surface of the inner electrode is regarded as the grain size, and an average value of the grain sizes was calculated as the average grain size.

Then, 5 dielectric layers were randomly extracted from the SEM image of the measurement region. In each layer, 20 lines (a total of 100 lines in 5 layers), each of which is perpendicular to the principal surface of the inner electrode adjacent to each layer, were drawn at an interval equal to the average grain size, and the number of crystal grains sectioning each line were counted. The number of crystal grains were summed up and the sum was divided by the total number 100 of the lines to give a value A. The same was performed for 5 samples having the same sample number, and the average value of the obtained A was used as the average number of crystal grains per element (the average number of crystal grains per dielectric layer in the stacking direction).

The measurement results of the average number of crystal grains (average grain number) per dielectric layer for the samples (multilayer ceramic capacitor) No. 1 to 23 prepared according to the present preferred embodiment are listed together in Table 1.

For the multilayer ceramic capacitor prepared as described above, the high temperature load test was performed. In the high temperature load test, the multiplayer ceramic capacitor was applied with a voltage of 150 V at a temperature of 150° C., and the aging variations on insulation resistance were observed.

The high temperature load test was performed for 100 samples having the same sample number, and if the insulation resistance drops to 100 kΩ or less, it is determined that the sample has failed, and the MTTF at 50% was determined by the Weibull analysis of the failure time. Any sample having the MTTF of 700 h or less was determined as a non-standard product.

The results of the MTTF in the high temperature load test for the samples (multilayer ceramic capacitor) No. 1 to 23 prepared according to the present preferred embodiment are listed together in Table 1.

TABLE 1

| Sample No. | Composition (molar parts/100 molar parts of Ti) | | | | | Average Gain Number | High Temperature Load Test MTTF (h) |
| --- | --- | --- | --- | --- | --- | --- | --- |
| | La | Gd | Dy | Mg | Mn | | |
| *1 | 0.8 | — | — | 0.4 | 1.0 | 5.5 | 80 |
| *2 | 0.8 | — | — | 0.4 | 1.0 | 2.3 | 140 |
| *3 | 1.2 | — | — | 0.5 | 2.5 | 6.5 | 320 |
| 4 | 1.2 | — | — | 0.5 | 2.5 | 2.8 | 810 |
| 5 | 1.2 | — | — | 0.5 | 2.5 | 2.1 | 890 |
| *6 | 3.6 | — | — | 2.4 | 1.5 | 6.2 | 530 |
| 7 | 3.6 | — | — | 2.4 | 1.5 | 2.6 | 920 |
| 8 | 3.6 | — | — | 2.4 | 1.5 | 1.8 | 970 |
| *9 | 6.0 | — | — | 4.2 | 3.0 | 6.0 | 600 |
| 10 | 6.0 | — | — | 4.2 | 3.0 | 3.0 | 1110 |
| 11 | 6.0 | — | — | 4.2 | 3.0 | 2.0 | 1480 |
| *12 | 6.5 | — | — | 4.2 | 3.0 | 2.4 | 420 |
| *13 | 5.0 | — | — | 5.0 | 2.0 | 8.2 | 370 |
| 14 | 5.0 | — | — | 5.0 | 2.0 | 2.1 | 1040 |
| *15 | 3.6 | — | — | 5.5 | 1.5 | 2.3 | 280 |
| *16 | 4.0 | — | — | 4.0 | 1.0 | 8.5 | 320 |
| 17 | 4.0 | — | — | 4.0 | 1.0 | 2.1 | 900 |
| *18 | 2.4 | — | — | 1.5 | 0.5 | 2.5 | 20 |
| *19 | 2.4 | — | — | 1.5 | 4.0 | 2.4 | 300 |
| *20 | — | 3.6 | — | 1.8 | 1.5 | 2.1 | 80 |
| *21 | — | 3.6 | — | 1.8 | 1.5 | 6.8 | 240 |
| *22 | — | — | 3.6 | 1.8 | 1.5 | 2.2 | 40 |
| *23 | — | — | 3.6 | 1.8 | 1.5 | 7.5 | 110 |

The samples with an asterisk mark (*) appearing before the sample number in Table 1 are samples failed to satisfy the conditions of the present invention, and the other samples are those satisfying the conditions of the present invention.

It was confirmed from Table 1 that the samples satisfying the conditions of the present invention (without an asterisk mark appearing before the sample number) have an MTTF value of 700 h or more in the high temperature load test, and thereby, have a great insulation deterioration tolerance and a high reliability.

On the contrary, for those samples such as samples No. 1 and 2 added with an amount of La and/or Mg less than the range of the present invention, it was confirmed that the insulation resistance deteriorates remarkably in the high temperature load test regardless of the average number of crystal grains (average grain number) per dielectric layer.

In addition, for those samples such as samples No. 12 and 15 added with an amount of La and/or Mg exceeding the range of the present invention, it was confirmed that the insulation deterioration tolerance deteriorates in the high temperature load test.

Further, for those samples such as samples No. 18 and 19 added with an amount of Mn out of the range of the present invention, it was confirmed that the insulation deterioration tolerance deteriorates in the high temperature load test.

Furthermore, for those samples such as samples No. 20 to 23 containing the rare earth elements Gd and Dy rather than La and thereby not satisfying the conditions of the present invention, compared to the samples within the scope of the present invention, it was confirmed that the tolerance deteriorates in the high temperature load test.

Moreover, for those samples such as samples No. 3, 6, 9, 13 and 16 having a greater average number of crystal grains (the average grain number) per layer, compared to the samples having the average number of crystal grains (the average grain number) within the scope of the present invention, it was confirmed that the insulation resistance tends to deteriorate faster.

From the results mentioned above, it was confirmed that the multilayer ceramic capacitor which has a great insulation deterioration tolerance and a high reliability can be obtained from those samples in which the fraction of each content of La, Mg and Mn relative to the content of Ti determined by the ICP emission spectrometry performed on the multilayer body is in the range that La is about 1.2 to about 6.0 molar parts, Mg is about 0.5 to about 5.0 molar parts and Mn is about 1.0 to about 3.0 molar parts, assuming that the content of Ti is 100 molar parts, and the average number of crystal grains in each dielectric layer is one or more to three or less.

In the above preferred embodiments, the fraction of each content of La, Mg and Mn relative to the content of Ti preferably has been determined for the multilayer body, and it is also acceptable to determine the fraction of each content of La, Mg and Mn relative to the content of Ti for the dielectric layer constituting the multilayer body.

The present invention is not intended to be limited to the above embodiments, the number of dielectric layers constituting the multilayer body, the number of internal electrodes and/or the fraction of the content of La, Mg and Mn relative to the content of Ti in the multilayer body or in the dielectric body may be applied or modified in various ways within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of stacked dielectric layers including a dielectric ceramic that includes a plurality of crystal grains and a plurality of internal electrodes disposed at a plurality of interfaces between the dielectric layers; and
   an external electrode provided on an outer surface of the multilayer body and electrically connected to some of the plurality of inner electrodes; wherein
   the multilayer body includes a Ba and Ti containing perovskite compound, and La, Mg and Mn;

in a case in which a content of Ti is set to 100 molar parts, a fraction of each content of La, Mg and Mn relative to the content of Ti is such that La is about 1.2 to about 6.0 molar parts, Mg is about 2.4 to about 5.0 molar parts and Mn is about 1.0 to about 3.0 molar parts; and an average number of crystal grains included in each of the dielectric layers in the stacking direction is one or more to three or less.

2. The multilayer ceramic capacitor according to claim 1, wherein the multilayer body includes a width of about 1.0 mm, a length of about 2.0 mm, and a thickness of about 0.6 mm, and a thickness of each of the plurality of dielectric layer is about 4.0 μm, and a thickness of each of the plurality of internal electrodes is about 0.8 μm.

3. A multilayer ceramic capacitor comprising:

a multilayer body including a plurality of stacked dielectric layers including a dielectric ceramic that includes a plurality of crystal grains and a plurality of internal electrodes disposed at a plurality of interfaces between the dielectric layers; and an external electrode provided on an outer surface of the multilayer body and electrically connected to some of the plurality of inner electrodes; wherein the multilayer body includes a Ba and Ti containing perovskite compound, and La, Mg and Mn;

in a case in which the multilayer body is subjected to a dissolution treatment to form a solution and a content of Ti is set to 100 molar parts, a fraction of each content of La, Mg and Mn relative to the content of Ti is such that La is about 1.2 to about 6.0 molar parts, Mg is about 2.4 to about 5.0 molar parts and Mn is about 1.0 to about 3.0 molar parts; and an average number of crystal grains included in each of the dielectric layers in the stacking direction is one or more to three or less.

4. The multilayer ceramic capacitor according to claim 3, wherein the multilayer body includes a width of about 1.0 mm, a length of about 2.0 mm, and a thickness of about 0.6 mm, and a thickness of each of the plurality of dielectric layer is about 4.0 μm, and a thickness of each of the plurality of internal electrodes is about 0.8 μm.

5. A multilayer ceramic capacitor comprising:

a multilayer body including a plurality of stacked dielectric layers including a dielectric ceramic that includes a plurality of crystal grains and a plurality of internal electrodes disposed at a plurality of interfaces between the dielectric layers; and an external electrode provided on an outer surface of the multilayer body and electrically connected to some of the plurality of inner electrodes; wherein each of the plurality of dielectric layers includes a Ba and Ti containing perovskite compound, and La, Mg and Mn;

in a case in which a content of Ti is set to 100 molar parts, a fraction of each content of La, Mg and Mn relative to the content of Ti is such that La is about 1.2 to about 6.0 molar parts, Mg is about 2.4 to about 5.0 molar parts and Mn is about 1.0 to about 3.0 molar parts; and an average number of crystal grains included in each of the dielectric layers in the stacking direction is one or more to three or less.

6. The multilayer ceramic capacitor according to claim 5, wherein the multilayer body includes a width of about 1.0 mm, a length of about 2.0 mm, and a thickness of about 0.4 mm, and a thickness of each of the plurality of dielectric layer is about 4.0 μm, and a thickness of each of the plurality of internal electrodes is about 0.8 μm.

7. A method for manufacturing a multilayer ceramic capacitor which includes a multilayer body provided with a plurality of stacked dielectric layers including a dielectric ceramic that includes a plurality of crystal grains and a plurality of internal electrodes disposed at a plurality of interfaces between the dielectric layers, the method comprising the steps of:

preparing a ceramic slurry by blending powder including a Ba and Ti containing perovskite compound, an La containing compound powder, an Mg containing compound powder and an Mn containing compound powder into a slurry in which a content of Ti is set to 100 molar parts, a fraction of each content of La, Mg and Mn relative to the content of Ti is such that La is about 1.2 to about 6.0 molar parts, Mg is about 2.4 to about 5.0 molar parts and Mn is about 1.0 to about 3.0 molar parts;

obtaining a ceramic green sheet by forming the ceramic slurry into a sheet;

providing an unfired multilayer body by stacking the ceramic green sheet and a conductor pattern which defines the plurality of internal electrodes after firing; and firing the unfired multilayer body to provide the multilayer body which is configured in such a manner that each of the plurality of internal electrodes are disposed between adjacent pairs of the plurality of dielectric layers, and an average number of the crystal grains included in each of the dielectric layers in a stacking direction is one or more to three or less.

8. The method according to claim 7, wherein each powder was weighed such that the fraction of the content of Ba relative to the content of Ti is 103 molar parts relative to 100 molar parts of Ti.

9. The method according to claim 7, wherein the blending was performed by mixing in a ball mill while using water as a medium, pre-firing and pulverizing to provide a ceramic powder.

10. The method according to claim 7, wherein in the Ba and Ti containing perovskite compound, Ca and Sr are included in a site of Ba, and Zr and Hf are included in a site of Ti.

11. The method according to claim 7, wherein the step of preparing the ceramic slurry includes adding $R_2O_3$ (R=La, Gd, Dy), $MgCO_3$ and $MnCO_3$ to the perovskite compound powder.

12. The method according to claim 7, wherein the step of preparing the ceramic slurry includes adding a polyvinyl butyral-based binder and an organic solvent, and wet blending by a ball mill to prepare the ceramic slurry.

13. The method according to claim 7, wherein the step of forming the ceramic slurry into the sheet by a doctor blade method.

14. The method according to claim 7, wherein a thickness of the sheet is about 4.0 μm.

15. The method according to claim 7, wherein the step of firing is performed at temperature of about 1160° C. to about 1300° C.

16. The method according to claim 7, further comprising forming external electrodes on end surfaces of the fired multilayer body.

17. The method according to claim 7, wherein the fired multilayer body includes a width of about 1.0 mm, a length of about 2.0 mm, and a thickness of about 0.6 mm, and a thickness of each of the plurality of dielectric layer is about 4.0 μm, and a thickness of each of the plurality of internal electrodes is about 0.8 μm.

* * * * *